United States Patent [19]
Hirai et al.

[11] Patent Number: 5,524,926
[45] Date of Patent: Jun. 11, 1996

[54] AIR BAG FOR PROTECTING AN OCCUPANT

[75] Inventors: Kinji Hirai, Kanagawa; Hiroshi Tomita, Shiga, both of Japan

[73] Assignee: Takata Corporation, Tokyo, Japan

[21] Appl. No.: 404,758

[22] Filed: Mar. 15, 1995

[30]     Foreign Application Priority Data

Apr. 26, 1994   [JP]   Japan .................................. 6-088372

[51] Int. Cl.⁶ .................................................. B60R 21/20
[52] U.S. Cl. ............................................................ 280/743.1
[58] Field of Search .......................................... 280/743.1

[56]                  References Cited

U.S. PATENT DOCUMENTS 3,705,645  12/1972  Konen ................................. 280/743.1
5,071,161  12/1991  Mahon et al. ........................ 280/743.1
5,208,097   5/1993  Honma et al. ....................... 280/743.1
5,280,952   1/1994  Hirabayashi et al. ............... 280/743.1
5,452,914   9/1995  Hirai .................................... 280/743.1

FOREIGN PATENT DOCUMENTS 2-31965   2/1990  Japan .
4-266544  9/1992  Japan .

*Primary Examiner*—Kenneth R. Rice
*Attorney, Agent, or Firm*—Kanesaka & Takeuchi

[57]                ABSTRACT

An air bag made of an elastomer film which is bonded with a resin film covering the elastomer film.

10 Claims, 3 Drawing Sheets

AIR BAG FOR PROTECTING AN OCCUPANT

FIELD OF THE INVENTION

The present invention relates to an air bag made of an elastomer film for protecting an occupant when a vehicle comes into collision and more particularly, to an air bag which is improved in impact absorbing performance.

DESCRIPTION OF THE RELATED ART

An air bag device protects an occupant by deploying an air bag when a vehicle comes into collision.

A conventional air bag has been formed mainly by woven fabric made of fiber such as polyamide fiber, to which a coating of silicone rubber is applied. Recently, an air bag made of a resin film (Japanese patent laid open 2-31965) and an air bag made of an elastomer film (Japanese patent laid open 4-266544) have been proposed. However, the resin film has high hardness and low strength especially tear strength. Accordingly, the resin air bag is required to be made of films having enough large thickness to endure high stress which is applied when deploying. Hence, the air bag made of a resin film has a large packaging volume when folded.

An air bag made of an elastomer film has tear strength and elongation which are higher than one made of a hard resin film, so that it has enough durability against large stress applied by an inflator. However, our collision tests with using dammies have showed that the dummy collides with a steering wheel or an instrument panel located behind the air bag when the dummy plunges into the air bag deployed. This is because the air bag has high elongation and low modulus, so that the air bag is expanded by the dummy plunged thereto.

For preventing such a phenomenon, it is necessary to increase hardness of the elastomer film to restrict elongation thereof, or to increase the thickness of the film to increase the modulus. However, an air bag made of a film having increased hardness is rough to the touch for an occupant plunged thereto, and further the air bag is hard to be handled at a time of folding thereof. In addition, the film having increased hardness makes packaging volume of the folded air bag large.

The increase of the thickness of the film also makes the touch of the occupant to the air bag harder. In addition, the increase of the thickness of the film makes packaging volume of the air bag large and therefore makes the air bag device large.

For the air bag made of an elastomer film, the object is then to absorb enough impact when the occupant plunges into the air bag without increasing the hardness of the film or the thickness of the film.

OBJECT AND SUMMARY OF THE INVENTION

An object of the present invention is therefore to provide an air bag having great energy absorbing performance by restricting the excessive expansion of the air bag made of an elastomer film.

According to the present invention, an air bag made of an elastomer film is bonded with a resin film to cover a portion of the elastomer film.

Because the resin film has elongation which is lower than that of the elastomer film, in the air bag of the present invention, the elongation of the portion of the elastomer film where the resin film is bonded can be restricted when an occupant plunges into the air bag. In addition, a portion of the elastomer film where the resin film is not bonded elongates so as to absorb impact.

DESCRIPTION OF THE PREFERRED EMBODIMENTS

Hereinafter, embodiments will be described in detail with reference to the drawings.

FIGS. 1A through 1F are front views showing a front panel of an air bag for an occupant in a driver's seat (hereinafter, referred to as "a driver side air bag") in accordance with an embodiment of the present invention.

Figure 1A:
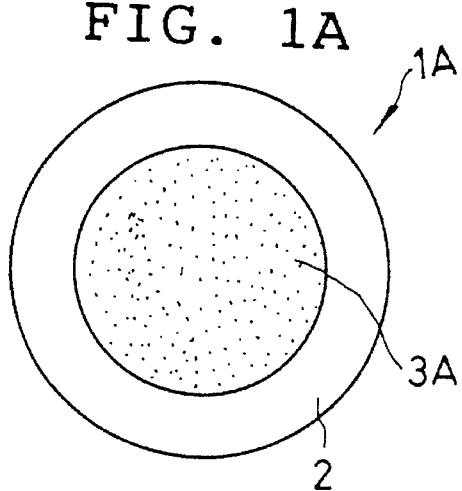
FIGS. 1A through 1F are front views each showing a front panel of an air bag for an occupant in a driver's seat in accordance with an embodiment of the present invention.

In a front panel 1A as shown in FIG. 1A, a resin film 3A of which diameter is smaller than that of an circular elastomer film 2 is bonded at the middle of the circular elastomer film 2.

Figure 1B:
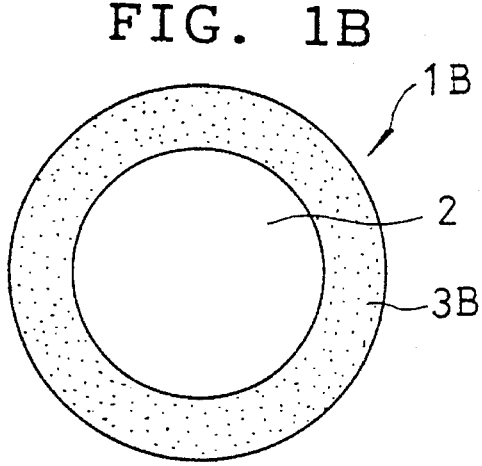

In a front panel 1B as shown in FIG. 1B, an annular resin film 3A of which diameter is substantially the same as that of the elastomer film 2 is bonded along the periphery of the circular elastomer film 2.

Figure 1C:
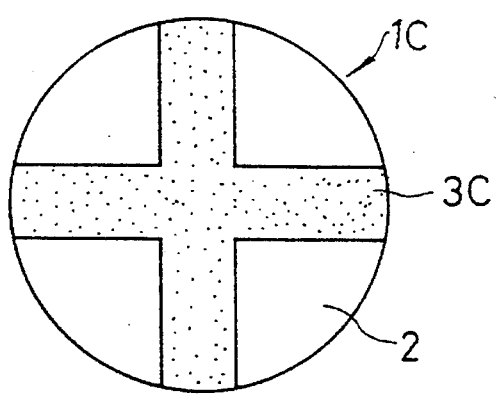

In a front panel 1C as shown in FIG. 1C, a cruciform resin film 3C having a suitable width is bonded to the circular elastomer film 2.

Figure 1D:
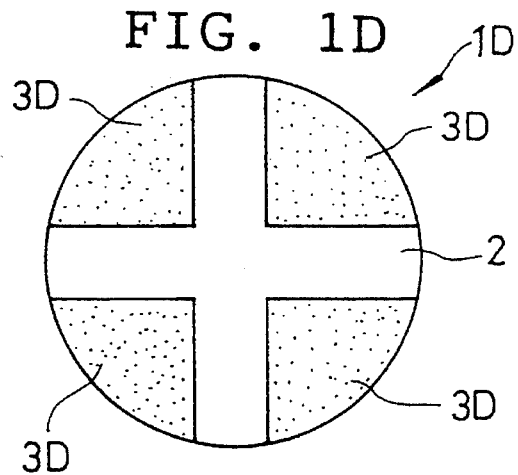

In a front panel 1D as shown in FIG. 1D, four resin films 3D formed in a quadrant fan shape are bonded to the circular elastomer film 2 so as to exclude a cruciform portion, having a suitable width, of the circular elastomer film 2.

Figure 1E:
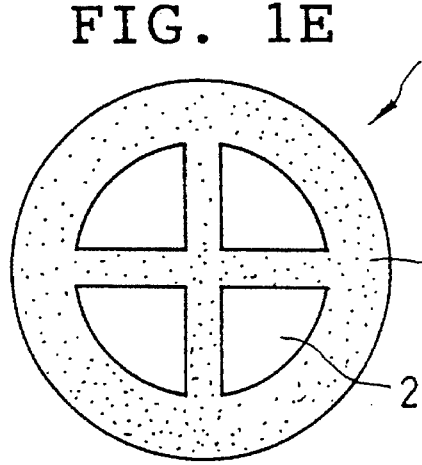

In a front panel 1E as shown in FIG. 1E, a resin film 3E formed in a combined cruciform and annular shape is bonded to the circular elastomer film 2.

Figure 1F:
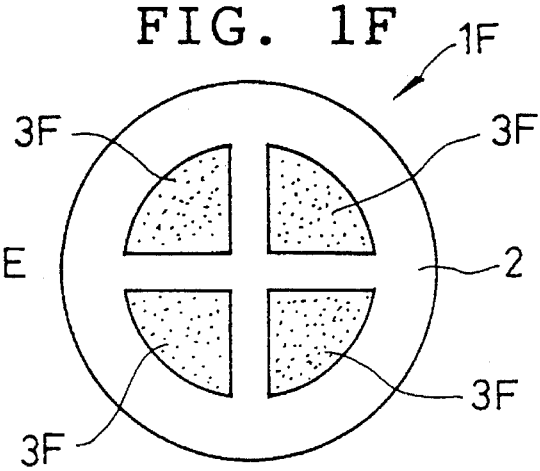
Figure 2:
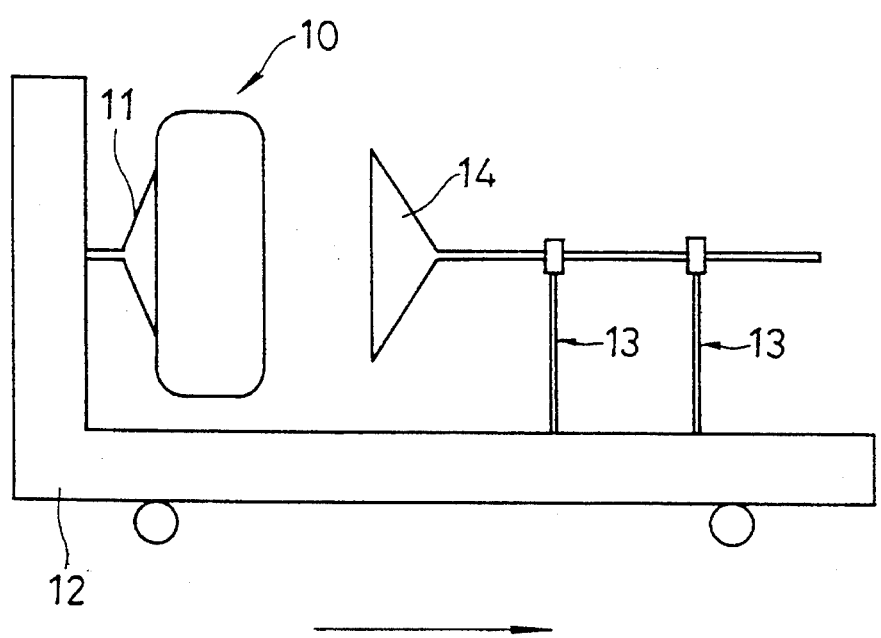
FIG. 2 is a view showing a structure of an impact testing machine which is used in experimental examples.

In a front panel 1F as shown in FIG. 1F, four resin films 3F formed in a quadrant fan shape are bonded to the circular elastomer film 2 so as to exclude a combined cruciform and annular portion of the circular elastomer film 2.

In order to make the driver side air bag in accordance with the present invention, one of the front panels as shown in FIGS. 1A through 1F and a circular rear panel of which diameter is the same as that of the front panel are superposed and joined (for example adhesive-bonded or welded) at the peripheries of these panels with each other. The rear panel has an opening for receiving an inflator and a vent hole.

In this case, the rear panel may comprise only an elastomer film or comprise an elastomer film and a resin film bonded to the elastomer film as shown in FIGS. 1A through 1F.

Since each structure shown in FIGS. 1A through 1F is one of embodiments of the present invention, the present invention is not limited to anything of the shown structures unless deviating from the subject matter of the invention. For instance, for the configuration of the resin film bonded to the elastomer film, other various configurations can be employed. Further, the resin film may be bonded only to the rear panel without being bonded to the front panel. Furthermore, in case where the resin films are bonded to both of the front panel and rear panel, respectively, the configuration of the resin film for the front panel may be different from that of the resin film for the rear panel.

With regard to the front panel to which the resin film is bonded, it is preferable that the surface of the front panel to which the resin film is bonded is an inner surface of the air bag. The reason is that the surface of the air bag is thereby made to be flat.

Figure 3:
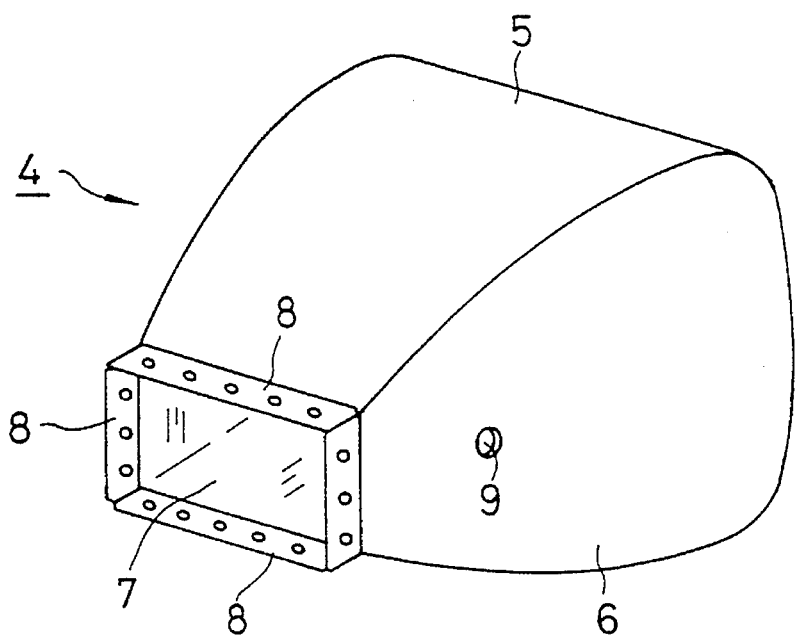
FIG. 3 is a perspective view of an air bag for an occupant in a passenger seat in accordance with an embodiment.
Figure 4:
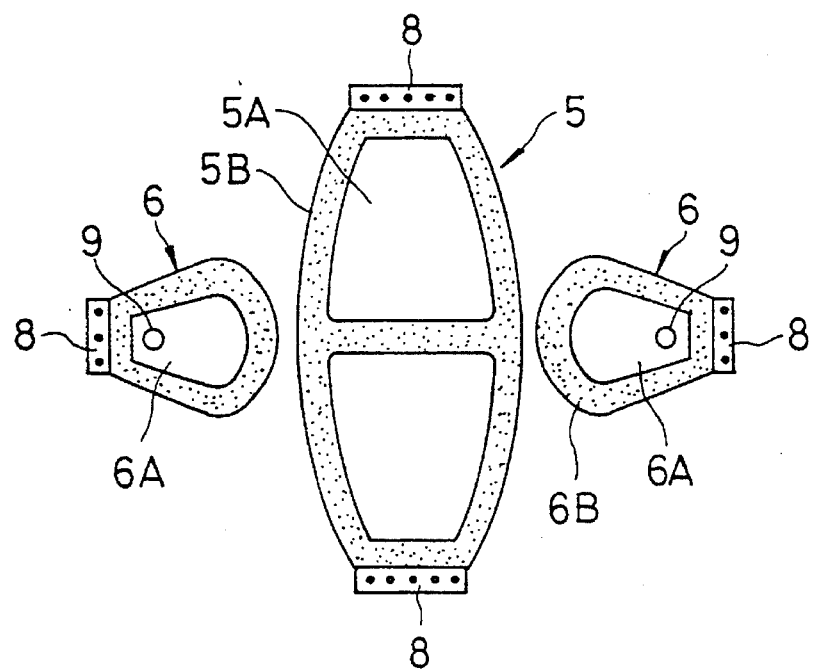
FIG. 4 is a plan view showing panels of the air bag shown in FIG. 3.

FIG. 3 is a perspective view of an air bag 4 for an occupant in a passenger seat (hereinafter, referred to as "a passenger side air bag 4") in accordance with an embodiment and FIG. 4 is an exploded view of the passenger side air bag 4. The passenger side air bag 4 comprises a center panel 5 and side panels 6, 6 and is provided with an opening 7 for receiving gas from an inflator. The air bag is provided with flaps 8 along the opening 7 to mount the air bag 4 to a container (not shown). The numeral 9 designates vent holes.

The center panel 5 and the side panels 6, 6 are made of elastomer films 5A and 6A to which resin films 5B and 6B are bonded inside of the air bag, respectively. Though the resin films 5B and 6B are mainly disposed along the peripheral edges of the center panel 5 and the side panels 6, respectively, these may be disposed on other place.

According to the present invention, the elastomer film may be made of thermoplastic elastomer and/or rubbery elastomer. As a thermoplastic elastomer film, a film of urethane series, ester series, olefin series, polyfluorocarbon series, styrene series, 1,2-polybutadiene series, amid series, chlorinated polyethylene series or the like, a film of series mixed among the above mentioned series, or a film comprising any of the above mentioned films laminated each other may be employed. As a rubber elastomer film, a film of butadiene series, chloroprene series, acrylic series or the like, or a film comprising any of the above mentioned rubber elastomer films laminated each other may be employed. In addition, a film comprising any of the rubber elastomer films and any of the thermoplastic elastomer films which are laminated with each other may be also employed. The thickness of such an elastomer film is decided due to the balance of the solid state properties, such as, in particular, breaking strength, breaking extension, tear strength and the initial modulus. We cannot absolutely decide but the thickness is preferably about 0.1~0.6 mm, more preferably 0.2~0.4 mm, since, practically, there are problems of worsening the touch of the occupant and of increasing the volume of the air bag when the film is too thick, and there is a problem of reducing the modulus when the film is too thin.

For the resin film, a film of polyester, polypropylene, ethylenevinyl alcohol, polyamide, polybuthylene terephthalate or the like can be employed. When the resin film is too thin, the expansion restricting effect of the elastomer film by providing with the resin film cannot be obtained enough and on the contrary when the resin film is too thick, the packaging volume of the air bag is large. Therefore, the thickness of the resin film is preferably about 0.005~0.15 mm, more preferably 0.01~0.1 mm.

To bond such a resin film to the elastomer film, a bond by adhesives or welding is preferable.

The present invention will be described in more detail with reference to the following experimental examples.

EXAMPLE 1

Base sheets of a front panel and a rear panel, each of which had a diameter of 700 mm and was made of thermoplastic polyurethane (TPU:"TOUGHRETHANE® 390S30D" by Nihon Valqua Industries, Ltd.) film (0.3 mm thickness), were each bonded with a polybuthylene terephthalate resin (PBT: by Ohkura Industries, Inc.) film (0.04 mm thickness), formed in a circular shape with a diameter of 525 mm, by adhesives as shown in FIG. 1A so as to form the front panel and the rear panel, respectively. The front panel and the rear panel were joined with each other to make a test air bag so that surfaces to which the PBT films were bonded were the inside surfaces of the test air bag.

The rear panel was provided with an opening of 100 mm diameter disposed at the center thereof for receiving an inflator and provided with two vent holes of 20 mm diameter disposed at positions located 148 mm apart from the center.

Using the air bag made as mentioned above, measurements of the energy absorbing performance of the air bag were made by an impact testing machine by the way described below. As barometers of the energy absorbing performance, the maximum acceleration (G) for decelerating an impactor which is the ability to stop the impactor, absorption rate of kinetic energy of the impactor, and the maximum value of inner pressure of the air bag when the impactor comes into collision were used.

A test air bag 10 was mounted to the steering wheel 11. A sled 12 was pneumatically pushed out at the predetermined speed shown in Table 1 and the air bag 10 was deployed by igniting the inflator (not shown). The air bag 10 was collided to the impactor 14 (the weight is 30 kgf) supported to supporting members 13. At this point, the coordinates were taken on the sled 12 and the acceleration of the deceleration of the impactor 14 and the inner pressure of the air bag were recorded and analyzed to find the above mentioned barometers. The experimental results are shown in Table 1.

EXAMPLE 2

An air bag for this example was made in the same manner of Example 1 but substituting an annular PBT film (the thickness is 0.04 mm) with an outer diameter of 700 mm and with an inner diameter of 370 mm as shown in FIG. 1B for the circular PBT film in order to form a front panel. Then, measurements of the energy absorbing performance of the air bag were made in the same manner. The experimental results are shown in Table 1.

COMPARATIVE EXAMPLE 1

An air bag for this example was made in the same manner of Example 1 but not bonding the PBT films to both base sheets of the front panel and the rear panel. Then measurements of the energy absorbing performance of the air bag were made in the same manner. The experimental results are shown in Table 1.

COMPARATIVE EXAMPLE 2

An air bag for this example was made in the same manner of Example 1 but using PBT films, not TPU films, for base sheets of the front panel and the rear panel. Then measurements of the energy absorbing performance of the air bag were made in the same manner. The experimental results are shown in Table 1.

TABLE 1

| Example | Base sheet | Resin Film Front Panel | Resin Film Rear Panel | S.T. (km/hr) | M.A.I.D (G) | A.E.A.B (J) | I.PA.B (KPa) |
| --- | --- | --- | --- | --- | --- | --- | --- |
| E. 1 | TPU Film | Circular PBT Film with 525 mm D | Circular PBT Film with 525 mm D | 33.6 | 42.77 | 1122.9 | 44.3 |
| E. 2 | TPU Film | Annular PBT Film with 700 mm O.D & 370 mm I.D | Circular PBT Film with 522 mm D | 33.6 | 41.33 | 1056.4 | 47.7 |
| C.E. 1 | TPU Film | — | — | 34.2 | 93.95 | 952.1 | 36.5 |
| C.E. 2 | PBT Film | — | — | No measurement due to breakage | | | |

E. = Example, C.E. = Comparative Example, S.T. = Speed of sled, M.A.I.D = Maximum Acceleration of Impactor Deceleration, A.E.A.B = Absorbed Energy of Air Bag, I.PA.B = Inner Pressure of Air Bag, D = diameter, O.D = Outer Diameter, I.D = Inner Diameter Table 1 clearly shows the followings. In a case of the air bag made of only TPU films (Comparative Example 1), though the impactor was decelerated by applying acceleration in the decelerating direction after the impactor collided with the deployed air bag, the impactor was rapidly stopped by colliding with the steering wheel because the air bag expands according to the plunge of the impactor into the air bag due to the elastic property of the TPU films and therefore had insufficient resistance force to stop the impactor.

Accordingly, the maximum acceleration of the impactor deceleration was quite large and 93.95 G. In addition, the resistance force sufficient to stop the impactor could not be obtained. The inner pressure of the air bag was then 36.5 KPa and the absorbed energy was 952.1 J, both values being low.

On the other hand, in Examples 1 and 2 in which PBT films were bonded, the excessive expansion of the air bag was restricted without losing the elasticity of TPU so as to keep the inner pressure of the air bag higher. Hence, the impactor could be received by the air bag without colliding with the steering wheel, so that the maximum acceleration of the impactor deceleration was half or less than that in Comparative Example 1 and further the absorbed energy was increased.

It should be noted that the air bag made of PBT films was broken when the deployment of the air bag.

As mentioned above, according to the present invention, it can provide an air bag made of an elastomer film, which has great energy absorbing performance and is excellent for protecting an occupant.

What we claim is:

1. An air bag for protecting an occupant comprising a main body made of an elastomer film, and a resin film covering at least a portion of said elastomer film.

2. An air bag as claimed in claim 1, wherein said elastomer film is made of thermoplastic elastomer and/or rubbery elastomer.

3. An air bag as claimed in claim 1, wherein the thickness of said elastomer film is 0.1~0.6 mm.

4. An air bag as claimed in claim 1, wherein said resin film is a film of polyester, polypropylene, ethylenevinyl alcohol, polyamide, or polybuthylene terephthalate.

5. An air bag as claimed in claim 1, wherein the thickness of said resin film is 0.005~0.15 mm.

6. An air bag as claimed in claim 1, wherein the resin film is bonded to said elastomer film by at least one of adhesing and welding.

7. An air bag as claimed in claim 1, wherein said air bag is for a driver and comprises a front panel and a rear panel, and said resin film is bonded to at least one of the front panel and the rear panel.

8. An air bag as claimed in claim 7, wherein said air bag has an inner surface and said resin film is bonded to said inner surface of the front panel.

9. An air bag as claimed in claim 1, wherein said air bag is for a passenger and comprises a center panel and side panels, and the center panel and the side panels are bonded with said resin film respectively.

10. An air bag as claimed in claim 9, wherein said air bag has an inner surface along peripheries of said center panel and said side panels, and said resin film is bonded to said inner surface.

* * * * *